United States Patent
Burgos et al.

(10) Patent No.: US 11,448,902 B2
(45) Date of Patent: Sep. 20, 2022

(54) COLORED OPTICAL ARTICLE WITH NEUTRAL TRANSMITTING COATING HAVING ASYMMETRIC REFLECTANCE

(71) Applicant: Essilor International, Charenton-le-Pont (FR)

(72) Inventors: Montserrat Burgos, Charenton-le-Pont (FR); Michèle Thomas, Charenton-le-Pont (FR); Xiaohong Zhang, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 173 days.

(21) Appl. No.: 16/647,805

(22) PCT Filed: Sep. 19, 2018

(86) PCT No.: PCT/EP2018/075317
§ 371 (c)(1),
(2) Date: Mar. 16, 2020

(87) PCT Pub. No.: WO2019/057751
PCT Pub. Date: Mar. 28, 2019

(65) Prior Publication Data
US 2021/0341760 A1    Nov. 4, 2021

(30) Foreign Application Priority Data
Sep. 19, 2017 (EP) ..................................... 17306217

(51) Int. Cl.
*G02C 7/10* (2006.01)

(52) U.S. Cl.
CPC ............. *G02C 7/107* (2013.01); *G02C 7/104* (2013.01)

(58) Field of Classification Search
CPC ................................ G02C 7/107; G02C 7/104
USPC ...................... 351/41, 159.01, 159, 6, 159.62
See application file for complete search history.

(56) References Cited

U.S. PATENT DOCUMENTS

| | | |
|---|---|---|
| 3,679,291 A | 7/1972 | Apfel et al. |
| 6,089,712 A | 7/2000 | Harris |
| 6,793,339 B1 | 9/2004 | Yip et al. |
| 2016/0077361 A1 | 3/2016 | Wold et al. |
| 2017/0068114 A1 | 3/2017 | Jaglan |

FOREIGN PATENT DOCUMENTS

| | | |
|---|---|---|
| CN | 106646917 | 5/2017 |
| WO | WO 2007/146933 | 12/2007 |
| WO | WO 2009/001703 | 12/2008 |
| WO | WO 2017/077358 | 5/2017 |

OTHER PUBLICATIONS

International Search Report and Written Opinion Issued in Corresponding PCT Patent Application No. PCT/EP2018/075317, dated Oct. 23, 2018.

*Primary Examiner* — Tuyen Tra
(74) *Attorney, Agent, or Firm* — Norton Rose Fulbright US LLP

(57) ABSTRACT

The present invention relates to an optical article comprising: —a substrate, —one colouring component, so as to colour the substrate, and —coated on the substrate (a), an asymmetric interferential multilayer stack comprising at least one absorbing layer which absorbs in the visible region at a wavelength ranging from 380 to 780 nm.

23 Claims, 5 Drawing Sheets

COLORED OPTICAL ARTICLE WITH NEUTRAL TRANSMITTING COATING HAVING ASYMMETRIC REFLECTANCE

CROSS-REFERENCE TO RELATED APPLICATIONS

This application is a national phase application under 35 U.S.C. § 371 of International Application No. PCT/EP2018/075317 filed 19 Sep. 2018, which claims priority to European Patent Application No. 17306217.5 filed 19 Sep. 2017. The entire contents of each of the above-referenced disclosures is specifically incorporated by reference herein without disclaimer.

TECHNICAL FIELD OF THE INVENTION

The invention relates to the optics field, more particularly to an optical article, preferably an ophthalmic lens, having a selective filter or a functional filter that cuts at least visible spectrum through absorption.

More precisely the invention relates to an optical article having one coloring component as selective filter/functional filter, while having an aesthetic appearance and providing adjustment of the transmission in the visible region Tv without changing the filtering/functional function of the filter.

BACKGROUND INFORMATION AND PRIOR ART

Selective/functional filters are often used in the ophthalmic field. For instance, these selective/functional filters may be used for blocking at least part of the phototoxic blue light or for improving the ability of a color blind viewer to discriminate between different colored objects.

Indeed, visible light as perceived by humans approximately extends over a spectrum ranging from a 380 nm wavelength to a 780 nm wavelength, and more specifically from 400 to 700 nm.

However, the part of this spectrum, ranging from around 380 nm to around 500 nm, such as 420 to 450 nm, does correspond to a high-energy, essentially blue light, which is known to provide phototoxic effects on human eye health, and especially on the retina. Thus, it is known from the prior art to provide optical lens having a selective filter which is able to cut the above-mentioned phototoxic blue light.

Nevertheless, this kind of blue cut optical lens has generally an unpleasant yellow appearance. Indeed, blocking undesirable blue light wavelengths affects color balance, color vision if one looks through the optical device, and the color in which the optical device is perceived. Indeed, blue light-blocking optical articles incorporating at least one selective filter that at least partially inhibits light having a wavelength ranging from 420 to 450 nm tend to produce a color tint in the optical article as a "side effect", the latter appearing yellow, brown or amber. This is esthetically unacceptable for many optical applications, and may interfere with the normal color perception of the user if the device is an ophthalmic lens.

Also, a large proportion of the population, especially men, suffers from some form of color blindness or dyschromatopsia which reduces eye discrimination of different colored objects. In particular, all over the world, with a higher prevalence in western word, 7-10% of males and 0.5 to 1% of females are colorblind from a congenital color deficiency. It means that one of the three color photoreceptors: Long wavelength "L", Medium wavelength "M" and short wavelength "S" cones, which are sensitive to the red, green and blue portions of the visible spectrum respectively, presents a shift (or lack) of spectral sensitivity. These people can discriminate less colors that people with normal color vision. There are several types of dyschromatopsia: anomalous trichromacy (shift of spectral sensitivity of the opsin contained in the photoreceptor) or dichromacy (a photoreceptor does not transmit signal). The most recurrent color deficiency is deuteranomaly which is a red-green confusion provoked by M cone deficit. Thus, if a red/green color blind viewer were to look at an apple tree, any red apples would not stand out from the otherwise green leaves of the tree and the primary way that the apples could be distinguished would be by viewer recognition of the apple outline. Obviously, this condition causes increased viewer problems in object discrimination and even more problems when it is necessary to distinguish between red and green under circumstances where other characteristics (e.g. shape, outline, etc.) are not distinguishable.

Generally, so as improve the ability of a color blind individual, the optical article such as spectacle lens, comprises a selective filter, like an absorptive magenta dye, which is able to cut in the green of the visible spectrum, such as around 530 nm to 560 nm.

However, the resulting colored lens has a pinky unsightly aspect which is not easy to wear for men who are the most affected by color blindness.

In order to reduce this pink appearance, several solutions have been proposed in the prior art.

For instance, to render the appearance of lenses for color blindness more acceptable, U.S. Pat. No. 6,089,712 discloses a lens, where a central portion of the lens is tinted with the desired color correction for the individual eye and the outer surface of the lens is coated with a mirrored reflective material to make the color tinting invisible to an outside observer. The technique described in this document provides the desired color correction.

However, the presence of the mirror reflective surface on the lens has been found to be cosmetically unacceptable to some. Additionally, the mirrored surface may reflect such a high percentage of light that the spectacles may produce an image that is too dark for the wearer. Furthermore, the high reflectivity of the mirror often introduces unwanted backside reflection to the wear's eye.

For masking the pinky color of tinted lens for correcting color blindness, document WO2009/001703 discloses a lens which is prepared by first tinting the lens to a desired corrective color with a light filtering material and then dyeing the lens with a masking material having a neutral appearing tint. Especially, the filtering material is a color tint dye, which modifies the transmission of light in at least a region of the spectrum between 400 nm and 700 nm, e.g., by selectively absorbing a portion of the light within a selected wavelength range of the visible spectrum, and the masking material may comprise a neutral tint dye, e.g., one with a slight blue, brown, or gray tint. The masking dye absorbs light generally evenly over the entire visible range. It may be dispersed in the lens substrate and may be concentrated more highly toward the surface of the lens. By concentrating the masking material near the outside of the lens, the neutral tint predominates and the tint effect of the filtering material would be masked to an outside observer.

It is mentioned that lenses of different color tints can be provided for each of the patient's eyes and in a manner that renders the color corrective lenses substantially indistinguishable to an outside observer.

However, the transparency level of those special filtering lenses is very difficult to be controlled by tinting with mixed dyes.

We also know document U.S. Pat. No. 3,679,291, which discloses a filter with a neutral transmitting multilayer coating having asymmetric reflectance consisting of at least one absorbing layer formed of a metal and one or more dielectric layers. However, this document does not refer to coloring lens substrate.

In view of the foregoing issues, there is a need for an optical article comprising a coloring selective/functional filter such as described above, while having at the same time aesthetic appearance, and this without changing the filtering function of the filter.

Especially, there is a need to provide color corrective optical articles, for instance for patients with color blindness to treat the disability, but in which the color tints are not discernible to an outward observer and which are not prohibitively costly.

It is desirable that the process for manufacturing such optical article is simple, easy to implement and reproducible.

SUMMARY OF THE INVENTION

To address the needs of the present invention and to remedy at least to the above mentioned drawbacks of the prior art, the applicant provides an optical article comprising:

(a) a substrate, (b) one coloring component, so as to color the substrate, and (c) coated on the substrate (a), an asymmetric interferential multilayer stack comprising at least one absorbing layer which absorbs in the visible region at a wavelength ranging from 380 to 780 nm.

Due to its properties, the optical article according to the invention comprises a selective/functional filter, i.e.: coloring component, while having aesthetic and cosmetic appearance and this without changing the filtering/functional function of the filter.

Indeed, the Applicant has surprisingly discovered that the use of an asymmetric interferential multilayer stack enables to adjust/tune the transparency level of colored lens substrate without changing the filtering function of the coloring component which is selected for instance to correct color discrimination or to protect against phototoxic blue light. It has been discovered that the asymmetric interferential multilayer stack according to the invention enables to improve the aesthetic appearance of the colored substrate by reducing color saturation (Chroma C*) of transmitted light, such as substrates with Chroma higher than or equal to 10, preferably 15 and typically 25 in the international colorimetric system CIE L*a*b* (1976).

A further object of the invention is to provide the use of an optical article such as defined above for treating color-blind or reducing color of functional/selective filter comprising a coloring component having high Chroma C*, such as filters with Chroma higher than or equal to 10, preferably 15 and typically 20 in the international colorimetric system CIE L*a*b* (1976).

The feature or features of one embodiment may be applied to other embodiments even though not described or illustrated, unless expressly prohibited by the disclosure or the nature of the embodiments.

Some details associated with the embodiments described above and others are described below.

BRIEF DESCRIPTION OF THE FIGURES

The present invention will be described in more detail by referring to the appended drawings, wherein.

DETAILED DESCRIPTION OF THE INVENTION

Definitions

Figure 1:
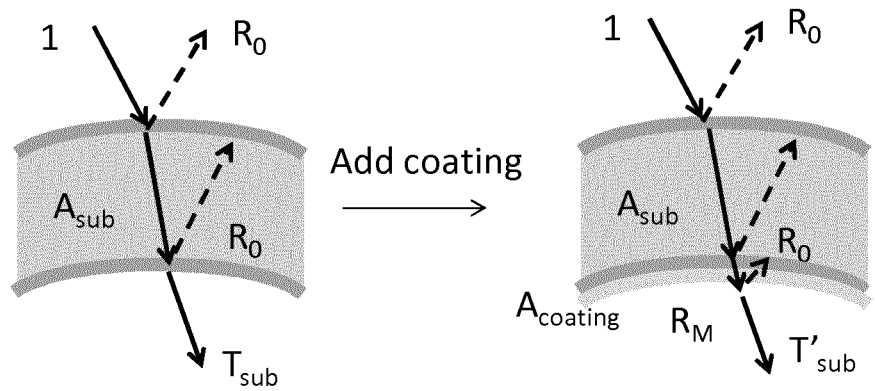
FIG. 1 is a schematic drawing showing the change of the overall transmittance before and after adding an asymmetric interferential multilayer stack (in grey) onto a colored substrate; "Acoating" refers to absorptance of the coating, "Asub" refers to absorptance of the substrate.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values "from X to Y" or "between X to Y", according to the present invention, means as including the values of X and Y.

In addition, any layer having a thickness lower than 0.8 nm will not be considered when counting the number of layers in the antireflective coating.

Unless stated otherwise, all thicknesses disclosed in the present application relate to physical thicknesses.

In the present application, when an ophthalmic lens comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or inner or Concave or CC) face of the substrate is intended to mean the face which, when using the ophthalmic lens, is the nearest from the wearer's eye. It is generally a geometrically concave face. On the contrary, the front (or Convex or CX) face of the substrate, is the face which, when using the ophthalmic lens, is the most distant from the wearer's eye. It is generally a geometrically convex face.

As used herein, the "angle of incidence (symbol 0)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b* (1976). Generally the angle of incidence changes from 0° (normal incidence) to 90° (grazing incidence). The usual range for angle of incidence is from 0° to 75°.

The colorimetric coefficients of the optical article of the invention in the international colorimetric system CIE L*a*b* (1976) are calculated between 380 and 780 nm, taking the standard illuminant D 65 and the observer into account (angle of 2°). The observer is a "standard observer" as defined in the international colorimetric system CIE L*a*b*.

The Tv factor, also called "luminous transmittance" of the system, is such as defined in the standard ISO-13666 and relates to an average in the 380-780 nm wavelength range that is weighted according to the sensitivity of the eye at each wavelength of the range and measured under D65 illumination conditions (daylight).

In the present description, unless otherwise specified, transmittances/transmissions are measured at the center of the optical article for a thickness ranging from 0.7 to 2 mm, preferably from 0.8 to 1.5 mm, at an angle of incidence ranging from 0° to 15°, preferably 0°. As used herein, the light transmitted refers to light arriving on the front main face of the optical article and that went through the lens.

Herein, the "luminous reflectance" noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

Optical Article

As mentioned above, the present invention relates to an optical article comprising:

(a) a substrate, (b) one coloring component (functional filter), so as to color the substrate, and (c) coated on the substrate (a), an asymmetric interferential multilayer stack comprising at least one absorbing layer which absorbs in the visible region at a wavelength ranging from 380 to 780 nm.

Generally, the optical article according to the present invention is a transparent colored optical article, preferably a lens or lens blank, and more preferably an ophthalmic lens or lens blank including spectacle lenses and sunglass lenses.

In the present description, unless otherwise specified, an optical article is understood to be transparent when the observation of an image through said optical article is perceived by a wearer and/or an observer without adversely affecting the quality of the image. This definition of the term "transparent" can be applied to all objects qualified as such in the description, unless otherwise specified.

The term "ophthalmic lens" is used to mean a lens adapted to a spectacle frame to protect the eye and/or correct the sight. Said lens can be chosen from afocal, unifocal, bifocal, trifocal and progressive lenses. Although ophthalmic optics is a preferred field of the invention, it will be understood that this invention can be applied to optical elements of other types where colored filter may be beneficial (for correcting color discrimination or filtering phototoxic blue wavelength), such as, for example, lenses for optical instruments, filters particularly for photography or astronomy, optical sighting lenses, ocular visors, optics of lighting systems, screens, glazings, windows, etc.

In particular, the substrate (a), in the sense of the present invention, should be understood to mean an uncoated substrate, and generally has two main faces: a front main face and a rear main face. These main faces are the faces through which light is transmitted to reach the wearer eyes. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for the stack of one or more coatings or layers.

The substrate (a) of the article of the invention may be a mineral or an organic substrate, for instance an organic substrate made from a thermoplastic or thermosetting plastic, generally chosen from transparent materials of ophthalmic grade used in the ophthalmic industry.

To be mentioned as especially preferred classes of substrate materials are polycarbonates, polyamides, polyimides, polysulfones, copolymers of polyethylene therephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company, the corresponding marketed lenses being referred to as ORMA® lenses from ESSILOR), polycarbonates such as those derived from bisphenol-A, (meth) acrylic or thio(meth)acrylic polymers and copolymers such as poly methyl methacrylate (PMMA), urethane and thiourethane polymers and copolymers (such as MR series from Mitsui Chemicals), epoxy polymers and copolymers, episulfide polymers and copolymers.

Prior to depositing the asymmetric interferential multilayer stack onto the optionally coated substrate, for example with an abrasion-resistant layer and/or a scratch-resistant coating or with a sub-layer, the surface of said optionally coated substrate is usually submitted to a physical or chemical surface activating treatment, so as to reinforce the adhesion of the asymmetric interferential multilayer stack. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

This substrate (a) is colored by one coloring component (b), which acts as a selective/functional filter.

As used herein, a "selective/functional filter" corresponds to a coloring component which is able to cut at least one band of the visible spectrum through absorption. Indeed, the coloring component (b) is used to color lens substrate therewith, by which a given color vision rectifying spectral characteristic curve is attained by a filtering effect wherein light with a specific wavelength is absorbed to reduce transmissivity of the lens substrate.

According to the invention, "a colored substrate" means that the light transmitted through the substrate is not white, but colored, that is to say, the light from a white fluorescent source is transmitted through the substrate (a) to an observer such that the light is colored.

In a preferred embodiment, (b) the coloring component is an absorbing dye.

As used herein, an absorbing dye may refer to both a pigment and a colorant, i.e., can be respectively insoluble or soluble in its vehicle.

Generally, the absorbing dye is incorporated directly into (a) the substrate, and/or is incorporated in one coating deposited directly or indirectly at the surface of the substrate.

For instance, several methods of adding a coloring component (absorbing dye) is usable including a method wherein prior to the polymerization of a plastic lens substrate, a pigment is formulated into a monomer material, a method of dyeing a plastic lens substrate. The dyeing method of a plastic lens substrate includes a method of directly dyeing a lens substrate, and a method wherein a dyeable hard coat film (varnish) is first formed on a surface of a lens substrate and then the hard coat film is dyed.

The absorbing dyes usable in the present invention include reactive dyes, oil-soluble dyes, disperse dyes, and the like. For coloration of plastic lense substrates with reactive dyes, mention is made of methods including an internal coloring method wherein a reactive dye, which is able to form a covalent bond such as with a hydroxyl group in a monomer or polymer, is incorporated in a raw material, followed by polymerization, and a method wherein a reactive dye capable of forming a covalent bond such as with a hydroxyl group in a lens substrate is attached to via immersion. For complete dyeing, it is preferred for these methods to permit immersion of the lenses in an alkaline solution.

Examples of the oil-soluble dye include Solvent Yellow 102, Solvent Yellow 104, Solvent Yellow 117, Solvent Yellow 157, Solvent Orange 68, Solvent Orange 72, Solvent Orange 79, Solvent Green 26, Solvent Violet 33, Solvent Violet 39, Solvent Brown 46, Solvent Black 36, Solvent Black 50, Solvent Blue 97, Solvent Blue 99, Solvent Red 160, Solvent Red 175, Solvent Red 180, Solvent Red 216, and the like.

Examples of the disperse dye include Disperse Yellow 54, Disperse Yellow 122, Disperse Yellow 124, Disperse Yellow 128, Disperse Yellow 134, Disperse Yellow 140, Disperse Orange 5, Disperse Orange 37, Disperse Orange 93, Disperse Orange 103, Disperse Orange 112, Disperse Orange 134, Disperse Orange 370, Disperse Green 7, Disperse Violet 61, Disperse Violet 63, Disperse Brown 1, Disperse Brown 13, Disperse Blue 27, Disperse Blue 54, Disperse Blue 56, Disperse Blue 176, Disperse Blue 182, Disperse Blue 193, Disperse Red 146, Disperse Red 199, Disperse Red 202, Disperse Red 204, Disperse Red 291, and the like.

For the dyeing, with an absorbing dye, a lens substrate with or without formation of a hard coat film thereon, it is usual to use a method wherein a disperse dye is dispersed in hot water, or an oil-soluble dye is dissolved in an organic solvent, into which the lens substrate is immersed. This method is referred to as dip tinting.

In this case, in order to obtain an intended spectral characteristic curve, the absorbing dyes mentioned above may be used singly or in combination of two or more.

According to an embodiment of the invention, this coloring component/absorbing dye has a narrow absorption band in the phototoxic blue light: i.e., 420-450 nm range of the electromagnetic spectrum. Ideally, said absorption band is centered on around 430 nm. It preferably does not absorb, or very little (typically less than 5%, preferably less than 4%, more preferably, less than 3%, in regions of the visible spectrum outside the 410-450 nm wavelength range.

In some cases, it may be particularly desirable to selectively filter a relatively small portion of the blue spectrum, i.e., the 420 nm-450 nm region. Indeed, it has been found that blocking too much of the blue spectrum can interfere with scotopic vision and mechanisms for regulating biorhythms, referred to as "circadian cycles". Thus, in a preferred embodiment, the coloring component blocks less than one of the following values 5%, 4%, 3%, 2%, more preferably 1% of light having a wavelength ranging from 465 to 495 nm, preferably from 450 to 550 nm, arriving on the front main face of the optical article. In this embodiment, the coloring component selectively blocks the phototoxic blue light and transmits the blue light implicated in circadian rhythms.

According to this embodiment, the chemical nature of the absorbing dye that may act as a means for at least partially inhibiting light having a wavelength ranging from 420 to 450 nm is not particularly limited, provided that it has an absorption peak, ideally a maximum absorption peak, within the 420-450 nm range. The FWHM (Full Width at Half Maximum) is preferably lower than 80 nm, preferably lower than 60 nm. As used herein, FWHM corresponds to the width of a filter band.

The blue light blocking absorbing dyes, typically yellow dyes, may include one or more dyes from the group consisting of: auramine 0; coumarin 343; coumarin 314; nitrobenzoxadiazole; lucifer yellow CH; 9,10-bis(phenylethynyl)anthracene; proflavin; 4-(dicyanomethylene)-2- methyl-6-(4-dimethylaminostyryl)-4H-pyran; 2-[4-(dimethylamino)styryl]-1-methypyridinium iodide, lutein and zeaxanthin.

In embodiments, the absorbing dye comprises one or more porphyrins, porphyrin complexes, other heterocycles related to porphyrins, including corrins, chlorins and corphins, derivatives thereof, or the perylene, coumarin, acridine, indolenin (also known as 3H-indole) and indol-2-ylidene families. Derivatives are substances generally issued by an addition or substitution.

According to another embodiment of the invention, the coloring component absorbing dye (b) has a narrow absorption band in the green light: i.e., 500-580 nm range of the electromagnetic spectrum so as to overcome the effects of color blindness. Ideally, said absorption band is centered on around 560 nm. It preferably does not absorb, or very little, typically less than 5%, preferably less than 4%, more preferably, less than 3%, in regions of the visible spectrum outside the 500-580 nm wavelength range.

In one aspect of this embodiment, the coloring component has a narrow absorption band in the green light ranging from 500 to 560 nm of the electromagnetic spectrum.

In another aspect of this embodiment, the coloring component has a narrow absorption band in the green light ranging from 560 to 580 nm of the electromagnetic spectrum.

According to this embodiment, the chemical nature of the absorbing dye that may act as a means for at least partially inhibiting light having a wavelength ranging from 500 nm to 595 nm is not particularly limited, provided that it has an absorption peak, ideally a maximum absorption peak, within the 500 nm to 595 nm range. The FWHM (Full Width at Half Maximum) of the absorption spectrum of such dye in solution is preferably lower than 60 nm, preferably lower than 40 nm. When such dye is included in the substrate and/or coating, its absorption properties are modified and the FWHM (Full Width at Half Maximum) of the transmission spectrum of the optical lens comprising such dye is preferably lower than 100 nm, preferably lower than 60 nm. As used herein, FWHM corresponds to the width of a filter band, according to the configuration of use.

Preferably, the colouring component blocks at least 40%, preferably from 50 to 99% and typically from 60 to 99% of the light having a wavelength ranging from 500 to 580 nm arriving on said front main face of the substrate (a).

As used herein, "blocking at least 40%" comprises at least the followings values or any interval situated between these values: 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 770, 71, 72, 73, 74, 75, 80, 81, 82, 83, 84, 85, 86, 87, 88, 89, 90, 91, 92, 93, 94, 95, 96, 97, 98, 99, 100.

In the present application, "blocking X %" of incident light in a specified wavelength range does not necessarily mean that some wavelengths within the range are totally blocked, although this is possible. Rather, "blocking X %" of incident light in a specified wavelength range means that an average of X % of said light within the range is not transmitted. As used herein, the light blocked in this way is light arriving on the front main face of the optical article.

For instance, the absorbing dye for correcting color blindness may be selected from the products commercialized under the tradename: Orasol 363 (from BASF), Heliotrop Lumacel R (from M. Dohmen), NFR: teratop red dye (supplied by Huntsmann) or Sulforhodamine B (CAS number: 2609-88-3), or a combination thereof.

In order to compensate for the colored effect of the coloring component and obtaining an optical article having a cosmetically acceptable appearance when viewed by an external observer, the optical article comprises, coated on the front main face and/or on the rear main face of the substrate (a), an asymmetric interferential multilayer stack (c) comprising at least one absorbing layer which absorbs in the visible region at a wavelength ranging from 380 to 780 nm.

Without being bound by any theories, it seems that the asymmetric interferential multilayer stack according to the invention enables to adjust/tune the transparency level of the optical article by providing a flat transmission curve. Especially, this flat transmission curve of the interferential absorbing stack added to the coloring component (such as an absorbing dye) reduces transmissions baseline which decreases the saturation of the coloring agent (less Chroma C*, less vivid color) and the luminous transmittance in the visible range, Tv. In addition, the neutral effect of the interferential multilayer stack on the selectivity of the absorbing dyes (functional filter), maintains the global filtering function and thus the wearer benefit.

As used herein, an "asymmetric interferential multilayer stack" refers to a stack for which reflection properties are different when viewing from its both sides.

By referring to FIG. 1, it can be seen that the light transmission is different before and after the adding of the asymmetric interferential stack according to the invention. Especially, the following equations (1) to (3) may be obtained:

$$T_{sub}(\lambda) = (1-R_0(\lambda))^2 \cdot (1-A_{sub}(\lambda)) \quad \text{Eq1}$$

$$T'_{sub}(\lambda) = (1-R_0(\lambda))^2 \cdot (1-A_{sub}(\lambda))(1-R_M(\lambda))(1-A\text{coating}(\lambda)) \quad \text{Eq2}$$

$$T_{sub}(\lambda) = T_{sub}(\lambda)(1-R_M(\lambda))(1-A\text{coating}(\lambda)) \quad \text{Eq3}$$

where

R0 is reflectance between air and outmost surface of the lens substrate,

Asub is the absorptance of the lens substrate,

Acoating is the absorptance of the asymmetric interferential stack,

Rm is the reflectance of the asymmetric interferential stack,

Tsub is the transmittance of the colored lens substrate before coating with asymmetric interferential stack, T'sub is the transmittance of the colored lens substrate after coating with asymmetric interferential stack.

Thus, the main characteristic of this asymmetric interferential multilayer stack (c) is that, without taking into account the absorption from the colored functional substrate (i.e. Baseline), to provide a relatively flat transmittance (contribution from reflectance and absorptance, $f(\lambda)=(1-R_M(\lambda))(1-A\text{coating}(\lambda))$ through the entire visible light spectrum (380 nm-780 nm).

Especially, the interferential multilayer stack (c) has a luminous transmittance in the entire visible spectrum (380 to 780 nm) "Tv" lower than or equal to 75%, preferably ranging from 25 to 75% and more preferably from 40 to 55%.

According to the invention, "Tv" lower than or equal to 75% comprises at least the followings values or any interval situated between these values: 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 770, 71, 72, 73, 74, 75.

Generally, the asymmetric interferential multilayer stack comprises an alternating stack of one layer having a low refractive index (LI) and one layer having a high refractive index (HI).

In the present application, a layer of the asymmetric interferential multilayer stack is said to be a layer with a high refractive index (HI) when its refractive index is higher than or equal to 1.55, preferably higher than or equal to 1.6, even more preferably higher than or equal to 1.7, even more preferably higher than or equal to 1.8 and most preferably higher than or equal to 1.9. Said HI layer preferably has a refractive index lower than 3.

A layer of asymmetric interferential multilayer stack is said to be a low refractive index layer (LI) when its refractive index is lower than 1.55, preferably lower than or equal to 1.50, more preferably lower than or equal to 1.48. Said LI layer preferably has a refractive index higher than 1.1.

Unless otherwise specified, the refractive indexes referred to in the present application are expressed at 25° C. at a wavelength of 550 nm.

In one aspect of this embodiment, the absorbing layer of the (c) asymmetric interferential multilayer stack is a high refractive index (HI).

In one aspect of this embodiment, the absorbing layer of the (c) asymmetric interferential multilayer stack comprises at least:
  one metallic material selected from the metals, or metal nitrides of one or more of Silver (Ag), Aluminium (Al), Gold (Au), Barium (Ba), Boron (B), Cadmium (Cd), Cerium (Ce), Cobalt (Co), Chromium (Cr), Copper (Cu), Iron (Fe), Germanium (Ge), Hafnium (Hf), Indium (In), Iridium (Ir), Potassium (K), Lanthanum (La), Magnesium (Mg), Manganese (Mn), Molybdenum (Mo), Nickel (Ni), Neodymium (Nd), Niobium (Nb), Lead (Pb), Palladium (Pd), Platinum (Pt), Rhenium (Re), Antimony (Sb), Selenium (Se), Silicon (Si), Tin (Sn), Strontium (Sr), Tantalum (Ta), Titanium (Ti), Tellurium (Te), Thallium (Tl), Vanadium (V), Tungsten (N), Zinc (Zn) or Zirconium (Zr); or combination thereof and/or
  one absorptive oxide selected from SiO, FeO, Fe2O3, Fe3O4, TiOx, ZnO, MgO, CrOx, graphite oxide, or combination thereof; and
  optionally, one additional dielectric material (such as defined below), having preferably a high refractive index, so as to form a mixture with the metallic material and/or the absorptive oxide.

In another aspect of this embodiment, the absorbing layer of the (c) asymmetric interferential multilayer stack comprises at least:
  one organic molecule selected from complex of metallic compounds or carbon compounds, and
  optionally, one additional dielectric material having a high refractive index so as (such as defined below) to form a mixture with organic molecule defined above.

Alternatively of this embodiment, the organic molecule selected from complex of metallic compounds or carbon compounds may comprise one additional dielectric material having a low refractive index so as to form a mixture with the metallic material and/or with the organic molecule.

Generally, organic molecule selected from complex of metallic compounds and/or carbon compounds are deposited simultaneously with at least one dielectric material, such as described below so as to form the asymmetric interferential multilayer stack according to the invention.

Especially, complex of metallic compounds may be selected from CuPc: copper (II) phthalocyanine, Alq3: tris (8-hydroxyquinolinato)aluminium, etc., or combination thereof, and carbon compounds may be selected from Fullerenes (C60, C70), Single Walled Carbon Nanotubes (SWNT), etc., or combination thereof.

In a specific embodiment, the absorbing layer has a relatively flat extinction coefficient over the whole visible wavelength, meaning that the extinction coefficient of the absorbing material is almost constant, with standard deviation is less than 20%, preferably is equal to or lower than 15%, and typically is ranging from 5 to 20% of the average value.

As used herein, "lower than 20%" comprises at least the followings values or any interval situated between these values: 20, 19, 18, 17, 16, 15, 14, 13, 12, 11, 10, 9, 8, 17, 6, 5, 4, etc.

In some embodiments, two or more layers of absorbing materials are used, so that their combination yields a relatively flat (1-A)(1-R) curve (where A is Absorptance, R is Reflectance) over the visible wavelength domain.

Preferably, the asymmetric interferential multilayer stack (c) comprises an alternated stack of at least:
  one first layer comprising and preferably corresponding to the absorbing layer made for instance from at least one of the components described above (i.e. one metallic material, one absorptive oxide, one organic molecule, a combination of these materials with one dialectic material or combination thereof), and
  one second layer composed of at least one dielectric material, and which is different from the absorbing layer.

In general, the second layer defined above is made of at least one dielectric material selected from: $MgF_2$, $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, MgO, $Nd_2O_3$, $Nb_2O_5$, $Pr_2O_3$, $Sb_2O_3$, $Sc_2O_3$, SiO, $SiO_2$, $SnO_2$, $Ta_2O_5$, TiO, $TiO_2$, $Ti_2O_3$, $Ti_3O_5$, $WO_3$, $Y_2O_3$, $Yb_2O_3$, ZnO, $ZrO_2$; $A_1F_3$, $BaF_2$, $CaF_2$, $CdF_2$, $CeF_3$, $HfF_4$, $LaF_3$, LiF, $MgF_2$, NaF, $Na_3AlF_6$, $Na_5Al_3Fl_{14}$, $NdF_3$, $PbF_2$, $PrF_3$, $SrF_2$, $ThF_4$, $ZrF_4$; $Si_3N_4$, AlN, or diamond-like carbon, or one mixture thereof, and is preferably $SiO_2$.

In one aspect of this embodiment, the asymmetric interferential multilayer stack (c) may comprise an alternated stack of at least:
  one HI layer comprising and for instance consisting in the absorbing layer such as defined above (i.e. one metallic material, one absorptive oxide, one organic molecule, a combination of these materials with one dialectic material or combination thereof), and
  one LI layer.

Preferably, The LI layer is also well known and may comprise, without limitation, $SiO_2$, or a mixture of silica and alumina, especially silica doped with alumina, the latter contributing to increase the antireflective coating thermal resistance. The LI layer is preferably a layer comprising at least 80% by weight of silica, more preferably at least 90% by weight of silica, relative to the layer total weight, and even more preferably consists in a silica layer According to this embodiment, the asymmetric interferential multilayer stack may also comprise a layer having a high refractive index which is different from the absorbing layer described above, this second HI layer may be composed of at least one dielectric material, and which is different from the absorbing layer.

This second HI layer may be a traditional high refractive index layer that is well known in the art. It generally comprises one or more metal oxides such as, without limitation, zirconia ($ZrO_2$), titanium dioxide ($TiO_2$), alumina ($Al_2O_3$), tantalum pentoxide ($Ta_2O_5$), neodymium oxide (Nd$_2$O$_5$), praseodymium oxide (Pr$_2$O$_3$), praseodymium titanate (PrTiO$_3$), lanthanum oxide (La$_2$O$_3$), niobium oxide (Nb$_2$O$_5$), yttrium oxide (Y$_2$O$_3$). Optionally, the HI layers may further contain silica or other materials with a low refractive index, provided they have a refractive index higher than or equal to 1.5 as indicated hereabove and may be SiO. The preferred materials include SiO, TiO$_2$, PrTiO$_3$, ZrO$_2$, Al$_2$O$_3$, Y$_2$O$_3$ and mixtures thereof.

Generally, the asymmetric interferential multilayer stack has a number of layers higher than or equal to 2, preferably equal or higher than 3, and typically higher than or equal to 4. The asymmetric interferential multilayer stack has a number of layers lower than or equal to 10, preferably lower than or equal to 8, more preferably lower than or equal to 6 and ideally lower than or equal to 5.

Preferably, the outer layer of said (c) asymmetric interferential multilayer stack which is the furthest layer from the substrate (a) is a low refractive index layer.

In particular, the asymmetric interferential multilayer stack (c) comprises at least two layers with a low refractive index (LI) and at least two layers with a high refractive index (HI).

According to a particularly preferred embodiment, the asymmetric interferential multilayer stack is deposited on the concave side and comprises, in the direction moving away from the substrate,
- a layer having a refractive index higher than or equal to 1.55 with a thickness of from 0.8 to 25 nm, preferably from 1 to 15 nm;
- a layer having a refractive index lower than 1.55 with a thickness of from 90 to 130 nm, preferably from 100 to 120 nm;
- a layer having a refractive index higher than 1.55 with a thickness of from 1 to 50 nm, preferably from 3 to 35 nm and
- a layer having a refractive index lower than 1.55, with a thickness of from 80 to 100 nm, preferably from 85 to 95 nm.

According to a particularly preferred embodiment, the asymmetric interferential multilayer stack is deposited on the convex side and comprises, in the direction moving away from the substrate,
- a layer having a refractive index higher than or equal to 1.55 with a thickness of from 0.8 to 25 nm, preferably from 1 to 20 nm;
- a layer having a refractive index lower than 1.55 with a thickness of from 10 to 40 nm, preferably from 15 to 30 nm;
- a layer having a refractive index higher than 1.55 with a thickness of from 1 to 50 nm, preferably from 3 to 35 nm and
- a layer having a refractive index lower than 1.55, with a thickness of from 10 to 40 nm, preferably from 15 to 30 nm.

In a preferred embodiment, the layer having a refractive index higher than or equal to 1.55 is made of at least Cr, a mixture of Ti/TiOx (such as Grey A supplied by Umicore) as absorbing layer or SiO and the layer having a refractive index lower than 1.5 is made of at least silica.

As used herein, a layer of the asymmetric interferential multilayer stack is defined as having a thickness higher than or equal to 0.8 nm. Thus, any layer having a thickness lower than 0.8 nm will not be considered when counting the number of layers in the asymmetric interferential multilayer stack.

According to one aspect of the invention, the absorbing layer total thickness is lower than 100 nm, preferably lower than or equal to 80 nm, more preferably lower than or equal to 50 nm and even more preferably lower than or equal to 40 nm. The absorbing layer total thickness is generally higher than 0.8 nm, preferably higher than 1 nm, and typically higher than 1.2 nm.

For instance, the absorbing layer may have a total thickness ranging from 0.8 to 10 nm, preferably ranging from 1 to 5 nm, as it is the case for instance when the absorbing layer is Cr.

Alternatively, the absorbing layer may have a total thickness ranging from 10 to 50 nm, preferably ranging from 20 to 40 nm, as it is the case for instance when the absorbing layer is a mixture of Ti/TiOx.

Generally, the asymmetric interferential multilayer stack total thickness is lower than 1 micrometer, preferably lower than or equal to 800 nm, more preferably lower than or equal to 500 nm and even more preferably lower than or equal to 250 nm. The antireflective coating total thickness is generally higher than 100 nm, preferably higher than 150 nm, and typically higher than 180 nm.

Generally, the optical article may further comprise at least one color-balancing component.

In one embodiment, the color-balancing component employed to at least partially offset the yellowing effect is a dye, such as a blue tinting dye, or a mixture of dyes used in suitable proportions, such as a combination of red and green tinting dyes. In another embodiment, the color-balancing component employed to at least partially offset the pinky effect is a dye, such as a green tinting dye.

Color balancing dyes are typically incorporated in a color-balancing coating or film applied on the surface of the optical article, such as a primer coating, hard coat or antireflection coating.

Examples of suitable fixed-tint colorants can include, any of the art recognized inorganic and organic pigments and/or dyes. Organic dyes can be selected from azo dyes, polymethyne dyes, arylmethyne dyes, polyene dyes, anthracinedione dyes, pyrazolone dyes, anthraquinone dyes, auinophtalone dyes and carbonyl dyes. Specific examples of such organic dyes include Blue 6G, Violet PF and Magenta RB available from Keystone Aniline, Morplas Blue from Morton International, Inc., D&C Violet #2 available from Sensient Corp., Macrolex Violet 3R from Lanxess, and Rubine Red from Clariant Corporation. Also suitable are laser dyes, for example those selected from pyrromethene, fluoroscein, rhodamine, malachit green, oxazine, pyridine, carbazine, carbocyanine iodide, and others. Specific examples include ABS 574, ABS 668 or ABS 674 from Exiton, Inc.; or SDA2443, SDA3572 or ADA4863 available from H.W. Sands Corp. Mixtures of any of the aforementioned dyes can be used.

Preferably, the rear main face and/or the front main face of the optical article is/are coated with the asymmetric interferential multilayer stack according to the invention.

In some embodiments of the present optical article, (c) the asymmetric interferential multilayer stack is only coated on the rear main face of the substrate (a) which is concave and the luminous transmittance on the concave face of the asymmetric interferential multilayer stack, which is the furthest from the substrate, is lower than or equal to 2.5%, preferably 2.0% and ideally lower than or equal 1.5%.

In some embodiments of the present optical article, (c) the asymmetric interferential multilayer stack is only coated on the front main face of the substrate (a) which is convex and the luminous transmittance on the concave face of the asymmetric interferential multilayer stack, which is the nearest from the substrate, is lower than or equal to 2.5%, preferably 2.0% and ideally lower than or equal 1.5%.

In some embodiments of the present optical article, an identical (c) asymmetric interferential multilayer stack is coated on the front main face and on the rear main face of the substrate (a), the rear main face being concave and the front main face being convex, the luminous transmittance on the concave faces of these asymmetric interferential multilayer stacks is lower than or equal to 2.5%, preferably 2.0% and ideally lower than or equal 1.5%.

In some embodiments of the present optical article, two different (c) asymmetric interferential multilayer stacks are coated on the front main face and on the rear main face of the substrate (a), the rear main face being concave and the front main face being convex, the luminous transmittance on the concave faces of these asymmetric interferential multilayer stacks is lower than or equal to 2.5%, preferably 2.0% and ideally lower than or equal 1.5%.

In some embodiments of the present invention, the optical article, is further defined as blocking at least 40% of the light having a wavelength ranging from 500 to 580 nm arriving on said front main face of the substrate (a).

The various layers of the asymmetric interferential multilayer stack are preferably deposited by physical vapor deposition (PVD), under vacuum, according to any of the following methods: i) by optionally ion-beam assisted, evaporation; ii) by ion-beam sputtering; iii) by cathode sputtering; iv) by plasma-assisted deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the asymmetric interferential multilayer stack is conducted by evaporation under vacuum.

In some applications, it is preferred that the substrate's main surface be coated with one or more functional coating(s) to improve the optical and/or mechanical properties. The term "coating" is understood to mean any layer, layer stack or film which may be in contact with the substrate and/or with another coating, for example a sol-gel coating or a coating made of an organic resin. A coating may be deposited or formed through various methods, including wet processing, gaseous processing, and film transfer. These functional coatings classically used in optics may be, without limitation, an impact-resistant and/or adhesion primer, an abrasion-resistant and/or scratch-resistant coating, an anti-reflection coating, a polarized coating, a photochromic coating, or an antistatic coating, or a stack made of two or more such coatings, especially an impact-resistant primer coating coated with an abrasion and/or scratch-resistant coating. These functional coatings are known from the skilled person and will not be described hereafter.

Use of the Optical Article

A further object of the invention is to provide the use of an optical article such as defined above for treating color-blind or reducing color of functional/selective filter having high Chroma C* such as filters with Chroma higher than or equal to 10, preferably 15 and typically 20 in the international colorimetric system CIE L*a*b* (1976).

As used herein, "higher than or equal to 10" comprises at least the followings values or any interval situated between these values: 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 50, 60, 70, 80, etc.

The followings examples illustrate the present invention in a more detailed, but non-limiting manner.

EXAMPLES

1—General Procedures

The optical articles used in the examples comprise an ORMA® lens substrate from ESSILOR, having a 65 mm diameter, a refractive index of 1.50, a power of −2.00 diopters and a thickness of 1.2 mm. This lens substrate comprises a front face which is convex (CX) and a rear face which is concave (CC).

S1 sample is obtained by application of an epoxy coating on the substrate. Epoxy coating includes Orasol 363 dye (supplied by BASF), with a concentration of 3% wt in the dried coating. The coating is deposited by spin coating, heated for polymerization and has a final thickness of 3 µm.

S2 sample is obtained by dip tinting. The dip tinting process consists in using a water bath heated at temperature between 90 to 95° C. This water bath contains 15 g/L of a violet dye from M. Dohmen (Heliotrop Lumacel R) and a dispersing agent to facilitate dyes dispersion. The substrate is left for 10 minutes in the bath.

S3 sample is obtained by application of an epoxy coating on the substrate. Epoxy coating includes Sulforhodamine B (CAS number: 2609-88-3), with a concentration in the dried coating providing with a minimum transmittance of 12% at 570 nm wavelength. The coating is deposited by spin coating, heated for polymerization and has a final thickness of 3 µm.

The refractive index and transmittance of these samples were measured and then used with asymmetric stacks to design optical articles with a design software: Optical Thin Film Design: Essential Macleod (from Thin Film Center Inc)

2—Design and Simulations

Example 1: Effect of the Asymmetric Interferential Multilayer Stack

In this example, the asymmetric interferential multilayer stack comprises as HI layer: Cr which is the absorbing layer and $SiO_2$ as LI layer. This asymmetric stack has been coated on the rear face of the substrate (CC).

TABLE 1

| Layer | Material | Thickness (nm) |
|---|---|---|
| | substrate | |
| 1 | Cr | 1.4 |
| 2 | $SiO_2$ | 102.2 |
| 3 | Cr | 3.9 |
| 4 | $SiO_2$ | 90.5 |
| | air | |

Figure 2:
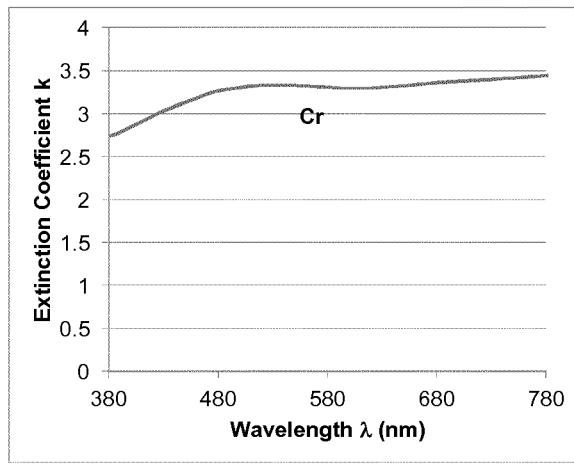
FIG. 2 shows the variation of the extinction coefficient k of chromium material used in the interferential stack of example 1.

As shown by FIG. 2, Cr has relatively flat extinction coefficient over the visible wavelength regime.

Figure 4:
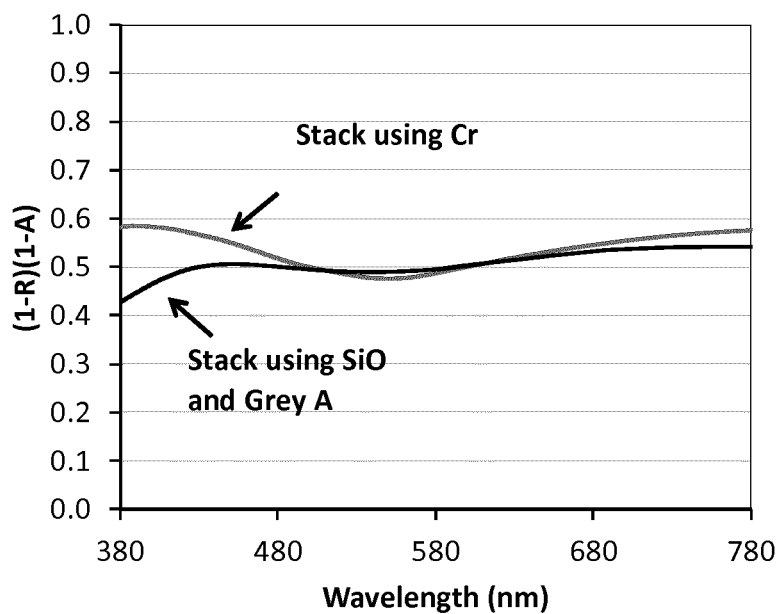
FIG. 4 shows the contribution from reflection and absorptance $f(\lambda)$ of the asymmetric stack of examples 1 and 2 according to the invention.

As shown on FIG. 4, the asymmetric stack of example 1 enables to reduce transmittance at each wavelength by 50%. Thus, $f(\lambda)=(1-R_M(\lambda))(1-A_{coating}(\lambda))=50\%$ ($\lambda$=380 nm to 780 nm).

Example 2 Effect of the Asymmetric Interferential Multilayer Stack

In this example, the asymmetric interferential multilayer stack comprises two components as absorbing layer (HI layers): SiO and Grey A from Umicore materials which is a mixture of Ti and TiOx) and SiO$_2$ as LI layer. This asymmetric stack has been coated on the rear face of the substrate (CC).

TABLE 2

| Layer | Material | Thickness (nm) |
|---|---|---|
|  | substrate |  |
| 1 | SiO | 11.8 |
| 2 | SiO$_2$ | 115.8 |
| 3 | Grey A | 30.8 |
| 4 | SiO$_2$ | 89.5 |
|  | air |  |

Figure 3:
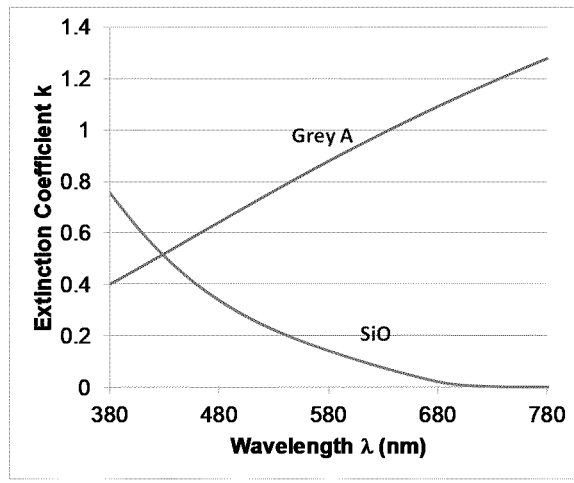
FIG. 3 shows the variation of the extinction coefficient k of SiO and Grey A materials used in the interferential stack of example 2.

As shown by FIG. 3, the extinction coefficient of SiO decreases with wavelength while Grey A's extinction coefficient increases with wavelength. They are complementary to each other and work together to give overall flat absorption.

Also, as shown on FIG. 4, the asymmetric stack of example 1 enables to reduce transmittance at each wavelength by 50%. Thus, $f(\lambda)=(1-R_M(\lambda))(1-A\text{coating}(\lambda))=50\%$ ($\lambda=380$ nm to 780 nm).

Example 3 Effect of the Asymmetric Interferential Multilayer Stack Coated onto a Colored Substrate Examples 1 and 2 have been reproduced with the use of different colored substrates S1 to S3 respectively.

Figure 5:
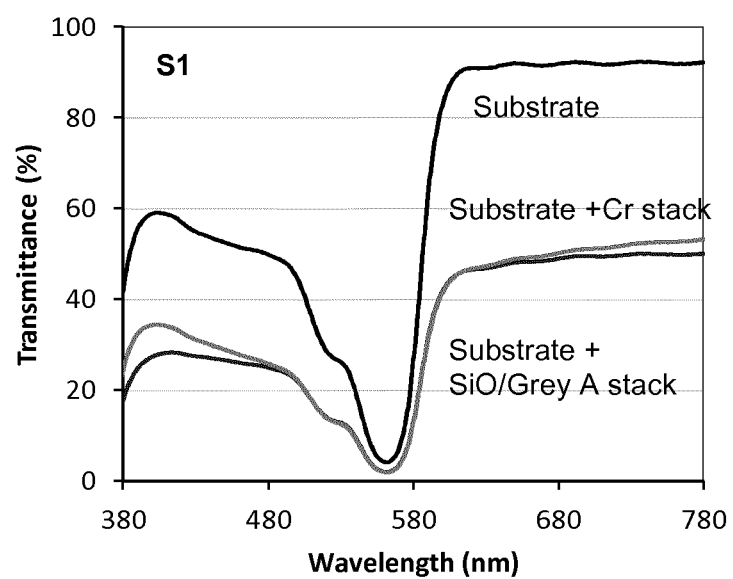
FIGS. 5 to 7 show the transmittance (%) according to the wavelength in the visible region of the colored substrate alone, of the colored substrate S1, S2 or S3 and the asymmetric stack of example 1 according to the invention, and of the colored substrate S1, S2 or S3 and the asymmetric stack of example 2 according to the invention, respectively.
Figure 6:
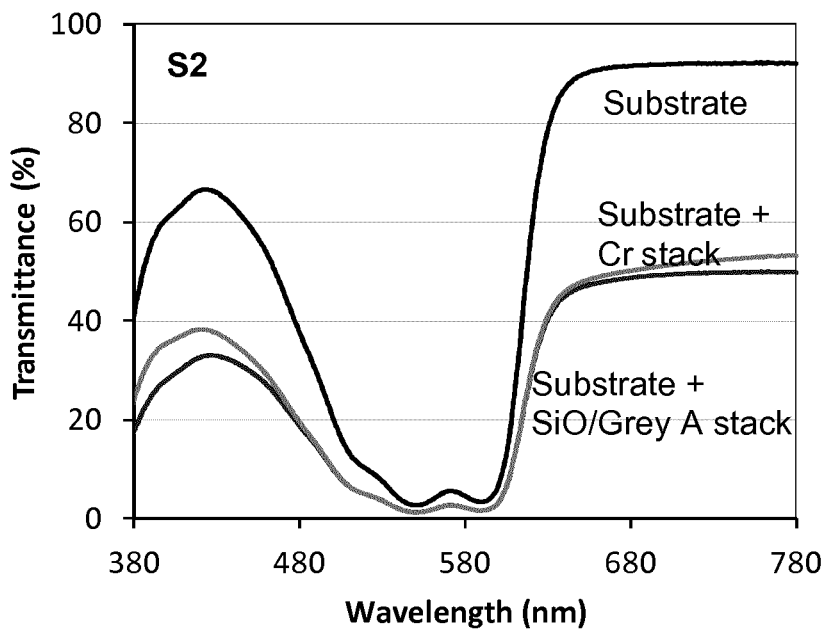
Figure 7:
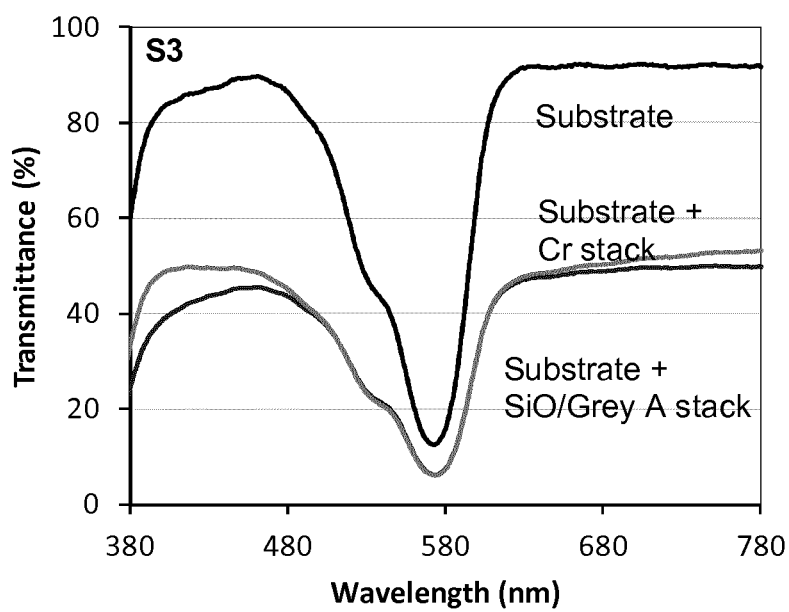

A shown by FIG. 5 to 7, with the addition of the flat asymmetric interferential multilayer stack of example 1 or example 2, the overall transmittance of various substrates has decreased without changing the transmittance curve shape thus the filtering function.

In addition, the below optical characteristics are obtained (tables 3 and table 4):

TABLE 3

Performance and color change with example 1 stack (Cr stack)

| Lenses | h* (10°) | C*(10°) | Tv(%), D65, 2° |
|---|---|---|---|
| S1 | 340 | 48 | 36.4 |
| S1 + example 1 | 336 | 42 | 18.3 |
| S2 | 318 | 80 | 15.1 |
| S2 + example 1 | 318 | 68 | 7.7 |
| S3 | 303 | 37 | 48.2 |
| S3 + example 1 | 302 | 35 | 21.4 |

TABLE 4

Performance and color change with example 2 stack (SiO/Grey A stack)

| Lenses | h* (10°) | C*(10°) | Tv(%), D65, 2° |
|---|---|---|---|
| S1 | 340 | 48 | 36.4 |
| S1 + example 2 | 340 | 39 | 18.2 |
| S2 | 318 | 80 | 15.1 |
| S2 + example 2 | 319 | 64 | 7.6 |
| S3 | 303 | 37 | 48.2 |
| S3 + example 2 | 302 | 30 | 24.1 |

As shown in the tables 3 and 4 above, with both asymmetric filter stack of examples 1 and 2 (Cr stack or SiO/Grey A Stack), on one hand, the transmittance is reduced by 50%. Thus, Tv is reduced by 50%, while the filtering function and hue angle stays about the same. On the other hand, the chroma for the transmitted light has decreased and the unpleasant color is less saturated and less bright.

Here the flat asymmetric stack of examples 1 and 2 are designed for backside of the lens substrate (CC) with minimum reflectance towards the eye. Thus, when viewing from the backside of the lens, the coating is anti-reflective coating and when viewing from the front side of the lens, the coating is a mirror.

Indeed, in the above lenses, the stacks of examples 1 and 2 are designed to coat on the CC side of the substrate. The total reflection viewed from the concave side by the wearer (including the reflection from the front surface) is less than 0.5% ($R_v$). It is an anti-reflective coating. When viewed from the convex side by the viewer, the total reflection (including the reflection from the back surface) is higher than 4%-5% after absorption from the substrate, which gives some mirror effect.

Example 4: Asymmetric Interferential Multilayer Stack Coated onto the CC Side of a Colored Substrate Versus Asymmetric Interferential Multilayer Stack Coated onto the CX Side of a Colored Substrate Examples 1 and 2 have been reproduced with the use of different colored-substrate S1 to S3 such as described in example 3, but the asymmetric interferential multilayer stack according to the invention has been coated onto either the CC side or the CX side of the colored substrate.

Figure 8:
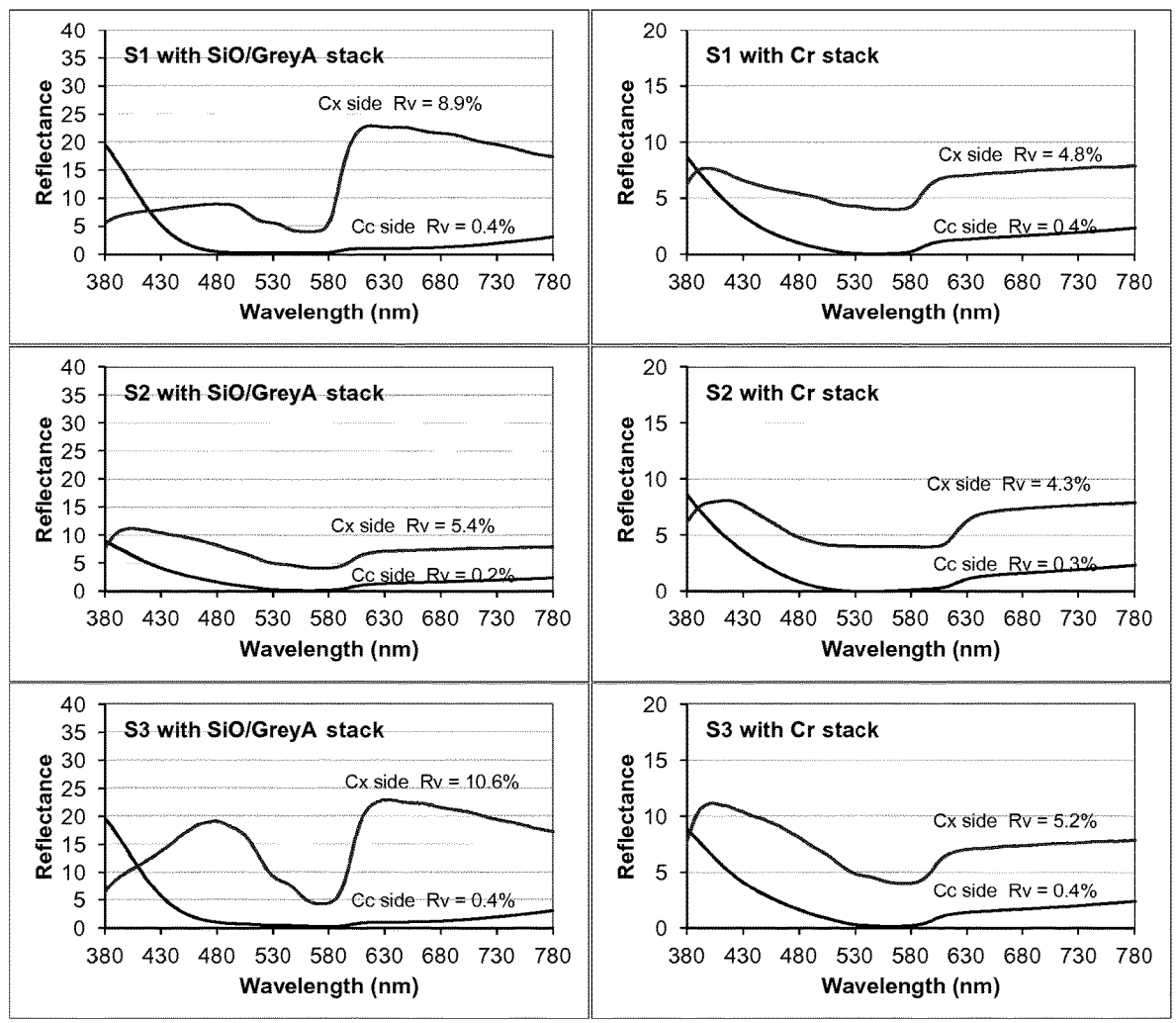
FIG. 8 shows the variation of the reflection (R) on CX side and CC side as a function of the wavelength in the visible region (380 to 780 nm) of the lenses according to example 3 when the asymmetric stack of example 1 or 2 is coated onto the concave (CC) side of the colored substrate according to the invention.

As shown by FIG. 8, for the stacks coated on the backside (Concave side) of the colored lens substrates, the total reflectance when viewing from the front side is high with mirror effect, while the total reflectance when viewing from the backside is low as an anti-reflective stack.

Example 5: Higher Mirror Effect

If a mirror with higher reflectance is needed, the interferential asymmetric stack can be designed to coat on the front side (CX side), while the backside reflectance is minimized.

Thus, in this example, the asymmetric interferential multilayer stack comprises as HI layers Grey A and SiO which are the absorbing layers and SiO$_2$ as LI layer. This asymmetric stack has been designed to coat on the front face of the substrate (CX).

TABLE 5

| Layer | Material | Thickness (nm) |
|---|---|---|
|  | Air |  |
| 4 | SiO$_2$ | 20.8 |
| 3 | Grey A | 32.4 |
| 2 | SiO$_2$ | 24.7 |
| 1 | SiO | 16.4 |
|  | substrate |  |

With S3 substrate as an example, the transmittance can be reduced by 50% while keep the spectra shape, filtering functions and hue angle nearly unchanged. The chroma of transmitted light can also be reduced even more.

Example 6

If AR on the backside is needed and the transmittance and chroma need to be further reduced, both front and back sides of the lens can be coated using the stacks of the examples.

For instance, the following asymmetric stacks, similar to stacks of example 5 for CX face and example 4 for CC face, may be used (table 6):

TABLE 6

| Layer | S3/CC | CX/S3/CC | CX/S3 | Thickness (nm) |
|---|---|---|---|---|
| CX | Air | Air | Air | |
| 4 | | SiO$_2$ | SiO$_2$ | 20.8 |
| 3 | | Grey A | Grey A | 32.4 |
| 2 | | SiO$_2$ | SiO$_2$ | 24.7 |
| 1 | | SiO | SiO | 16.4 |
| | S3 Substrate | S3 Substrate | S3 Substrate | |
| 1 | SiO | SiO | | 11.8 |
| 2 | SiO$_2$ | SiO$_2$ | | 115.8 |
| 3 | Grey A | Grey A | | 30.8 |
| 4 | SiO$_2$ | SiO$_2$ | | 89.5 |
| CC | Air | Air | Air | |

Results of Example 6

Figure 9:
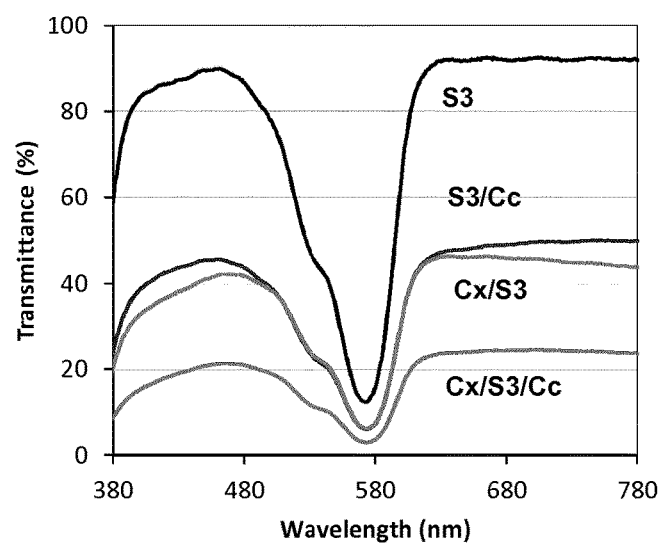
FIG. 9 shows the transmittance (%) according to the wavelength in the visible region of the colored substrate S3 alone, or of the colored substrate S3 when this one is coated with the asymmetric stack of example 6 on its CX side according to the invention, on its CC side or both on its CX and CC sides according to the invention.

FIG. 9 shows that the transmittance spectra changes if the S3 substrate is coated with either the asymmetric stack designed for CX side, the stack designed for CC side or both stacks such as described in table 6.

The optical performances are given in table 7 below:

TABLE 7

| Lenses | h* (10°) | C*(10°) | Tv(%), D65, 2° |
|---|---|---|---|
| S3 | 303 | 37 | 48 |
| S3/CC | 302 | 30 | 24 |
| CX/S3 | 302 | 24 | 24 |
| CX/S3/CC | 304 | 20 | 12 |

It can be also shown that the transmittance can be reduced by 50% if the asymmetric stack according to the invention is coated onto the CX side only or the CC side only. If both stacks are coated (one for front side, the other for back side), the transmittance is reduced by 25%. The chroma is reduced more with Cx stack compared to CC stack. With both side coated, the chroma is reduced almost by 45%.

Figure 10:
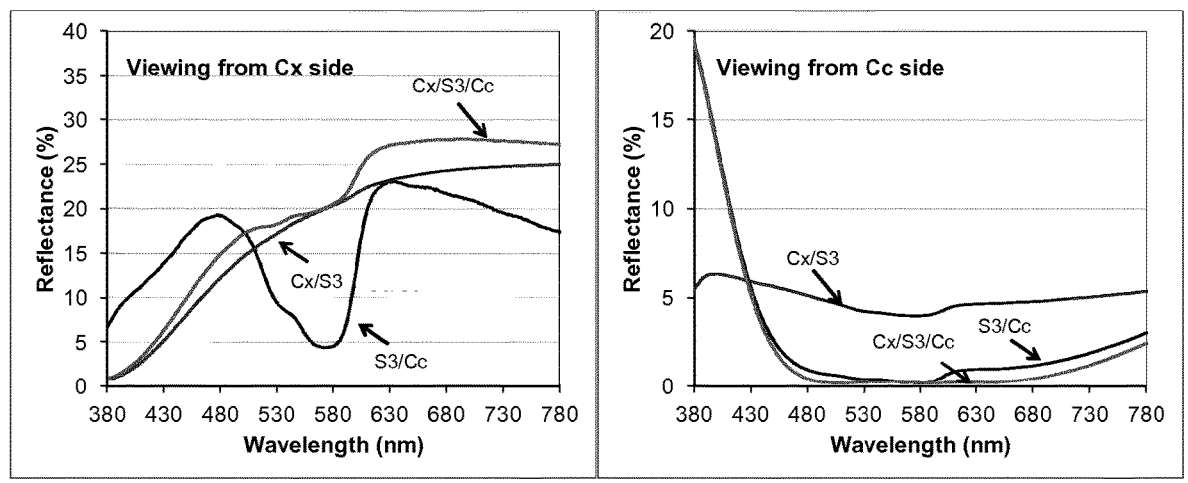
FIG. 10 shows the reflectance (%) on CX side and CC side according to the wavelength in the visible region of the colored substrate S3 alone, or according to the invention, of the colored substrate S3 when this one is coated with the asymmetric stack of example 6 on its CX side, on its CC side or both on its CX and CC sides.

By referring to FIG. 10 and table 8 below, when viewing from the front side and back side, the total reflectance is different due to the absorption from the substrate and the absorption from the stacks, as shown in Figures below.

TABLE 8

| | Lens configurations | Rv (%) D65, 2° |
|---|---|---|
| Viewing from front side (CX side) | S3/CC | 10.6 |
| | CX/S3 | 18.7 |
| | CX/S3/CC | 20.0 |
| Viewing from back side (CC side) | S3/CC | 0.5 |
| | CX/S3 | 4.3 |
| | CX/S3/CC | 0.2 |

When only asymmetric stack designed for Cx side is coated, the stack is a good mirror with minimized backside reflection (there is still reflection from the Cc surface).

When only asymmetric stack designed for Cc side is coated, the stack is a good AR with some mirror effect.

When both sides are coated on Cx side and Cc side with the asymmetric stack designed for Cx side and Cc side respectively, the configuration shows as a good mirror if viewed from front side, and shows as an AR if viewed from back side. Both total transmittance and chroma is greatly reduced in this example.

The invention claimed is:

1. An optical article comprising:
   (a) a substrate,
   (b) one colouring component, so as to colour the substrate, and
   (c) coated on the substrate (a), an asymmetric interferential multilayer stack comprising an alternated stack comprising at least:
       one first layer further defined as an absorbing layer which absorbs in the visible region at a wavelength ranging from 380 to 780 nm, and
       one second layer comprising at least one dielectric material that is different from the absorbing layer and further defined as SiO$_2$.

2. The optical article according to claim 1, wherein (b) the colouring component is an absorbing dye or a combination of absorbing dyes.

3. The optical article according to claim 2, wherein the colouring component blocks at least 40% of the light having a wavelength ranging from 500 to 580 nm arriving on said front main face of the substrate (a).

4. A method for treating colorblind or reducing color of functional/selective filtering having high Chroma C* comprising the use of an optical article according to claim 3.

5. The optical article according to claim 2, wherein the absorbing dye is incorporated directly into (a) the substrate, and/or is incorporated in one coating deposited directly or indirectly at the surface of the substrate.

6. The optical article according to claim 1, wherein (c) the interferential multilayer stack has a luminous transmittance in the entire visible spectrum (380 to 780 nm) "Tv" lower than or equal to 75%.

7. The optical article according to claim 6, wherein (c) the interferential multilayer stack has a luminous transmittance in the entire visible spectrum (380 to 780 nm) "Tv" ranging from 25 to 75%.

8. The optical article according to claim 7, wherein (c) the interferential multilayer stack has a luminous transmittance in the entire visible spectrum (380 to 780 nm) "Tv" ranging from 40 to 55%.

9. The optical article according to claim 1, wherein the absorbing layer of the (c) asymmetric interferential multilayer stack is a high refractive index layer (HI) having a refractive index higher than or equal to 1.55.

10. The optical article according to claim 1, wherein said absorbing layer of the (c) asymmetric interferential multilayer stack comprises at least:
    one metallic material selected from the metals, or metal nitrides of one or more of Silver (Ag), Aluminum (Al), Gold (Au), Barium (Ba), Boron (B), Cadmium (Cd), Cerium (Ce), Cobalt (Co), Chromium (Cr), Copper (Cu), Iron (Fe), Germanium (Ge), Hafnium (Hf), Indium (In), Iridium (Ir), Potassium (K), Lanthanum (La), Magnesium (Mg), Manganese (Mn), Molybdenum (Mo), Nickel (Ni), Neodymium (Nd), Niobium (Nb), Lead (Pb), Palladium (Pd), Platinum (Pt), Rhenium (Re), Antimony (Sb), Selenium (Se), Silicon (Si), Tin (Sn), Strontium (Sr), Tantalum (Ta), Titanium (Ti), Tellurium (Te), Thallium (Tl), Vanadium (V), Tungsten (N), Zinc (Zn) or Zirconium (Zr), or combination thereof; and/or
    one absorptive oxide selected from SiO, FeO, Fe2O3, Fe3O4, TiOx, ZnO, MgO, CrOx, graphite oxide, or combination thereof; and/or
    one organic molecule selected from complex of metallic compounds or carbon compounds; and/or optionally, one additional dielectric material so as to form a mixture with the organic molecule.

11. The optical article according to claim 1, wherein (c) the asymmetric interferential multilayer stack is only coated on the rear main face of the substrate (a) which is concave and the luminous reflectance on the concave face of the asymmetric interferential multilayer stack, which is the furthest from the substrate, is lower than or equal to 2.5%.

12. The optical article according to claim 11, wherein the luminous reflectance on the concave face of the asymmetric interferential multilayer stack, which is the furthest from the substrate, is lower than or equal to 2.0%.

13. The optical article according to claim 12, wherein the luminous reflectance on the concave face of the asymmetric interferential multilayer stack, which is the furthest from the substrate, is lower than or equal to 1.5%.

14. The optical article according to claim 1, wherein (c) the asymmetric interferential multilayer stack is only coated on the front main face of the substrate (a) which is convex and the luminous reflectance on the concave face of the asymmetric interferential multilayer stack, which is the nearest from the substrate, is lower than or equal to 2.5%.

15. The optical article according to claim 14, wherein the luminous reflectance on the concave face of the asymmetric interferential multilayer stack, which is the nearest from the substrate, is lower than or equal to 2.0%.

16. The optical article according to claim 15, wherein the luminous reflectance on the concave face of the asymmetric interferential multilayer stack, which is the nearest from the substrate, is lower than or equal 1.5%.

17. The optical article according to claim 1, wherein an identical (c) asymmetric interferential multilayer stack is coated on the front main face and on the rear main face of the substrate (a), the rear main face being concave and the front main face being convex, the luminous reflectance on the concave faces of these asymmetric interferential multilayer stacks is lower than or equal to 2.5%.

18. The optical article according to claim 17, wherein the luminous reflectance on the concave faces of these asymmetric interferential multilayer stacks is lower than or equal to 2.0%.

19. The optical article according to claim 18, wherein the luminous reflectance on the concave faces of these asymmetric interferential multilayer stacks is lower than or equal to 1.5%.

20. The optical article according to claim 1, wherein two different (c) asymmetric interferential multilayer stacks are coated on the front main face and on the rear main face of the substrate (a), the rear main face being concave and the front main face being convex, the luminous reflectance on the concave faces of these asymmetric interferential multilayer stacks is lower than or equal to 2.5%.

21. The optical article according to claim 20, wherein the luminous reflectance on the concave faces of these asymmetric interferential multilayer stacks is lower than or equal to 2.0%.

22. The optical article according to claim 21, wherein the luminous reflectance on the concave faces of these asymmetric interferential multilayer stacks is lower than or equal to 1.5%.

23. The optical article according to claim 1, further defined as an ophthalmic lens.

* * * * *

UNITED STATES PATENT AND TRADEMARK OFFICE
CERTIFICATE OF CORRECTION

PATENT NO. : 11,448,902 B2
APPLICATION NO. : 16/647805
DATED : September 20, 2022
INVENTOR(S) : Montserrat Burgos, Michèle Thomas and Xiaohong Zhang Page 1 of 1

It is certified that error appears in the above-identified patent and that said Letters Patent is hereby corrected as shown below:

In the Claims

Claim 16, Column 21, Line 30:
Delete "or equal 1.5%." and replace with -- or equal to 1.5%. --.

Signed and Sealed this
Tenth Day of January, 2023

Katherine Kelly Vidal
*Director of the United States Patent and Trademark Office*